Jan. 8, 1935. J. C. CREAGMILE 1,987,098
WHEEL ALIGNING DEVICE
Filed March 4, 1931 2 Sheets-Sheet 1

INVENTOR.
JOHN C. CREAGMILE
BY Henry N. Young
ATTORNEY

Jan. 8, 1935. J. C. CREAGMILE 1,987,098
WHEEL ALIGNING DEVICE
Filed March 4, 1931 2 Sheets-Sheet 2

INVENTOR.
JOHN C. CREAGMILE
BY Henry N. Young
ATTORNEY

Patented Jan. 8, 1935

1,987,098

UNITED STATES PATENT OFFICE 1,987,098

WHEEL ALIGNING DEVICE

John C. Creagmile, Berkeley, Calif.

Application March 4, 1931, Serial No. 520,094

13 Claims. (Cl. 33—203)

The invention relates to a device for gauging various alignment relations of dirigible wheels of automobiles and the like.

A general object of the invention is to provide generally improved gauging apparatus of the character described and which is particularly adapted for carrying out certain described operations for gauging the caster, camber, toe-in and turning radius of a wheel.

Other objects of the invention deal with detail mechanism for carrying out the broad idea, which mechanism embodies many improvements over the original conception of the invention.

The invention possesses other objects and features of advantage, some of which with the foregoing will be set forth or be apparent in the following description of a typical embodiment of the invention which is illustrated in the accompanying drawings, in which, Figure 1 is a front elevation of apparatus embodying the invention and having gauging units thereof shown disposed in gauging relation to a pair of coactive dirigible wheels of a vehicle.

In checking and adusting the alignment relations of the dirigible wheels of vehicles, it is necessary to jointly consider the camber, caster, toe-in, and turning radius relations of the coactive wheels, as these relations determine the steering performance of the vehicle on the road and the degree of wear on the wheel tires. In the present apparatus, means are provided for making the various determinations in a positive and readily understood manner, whereby the need for, and result of, any adjustment of the wheel settings may be obvious.

Figure 1:
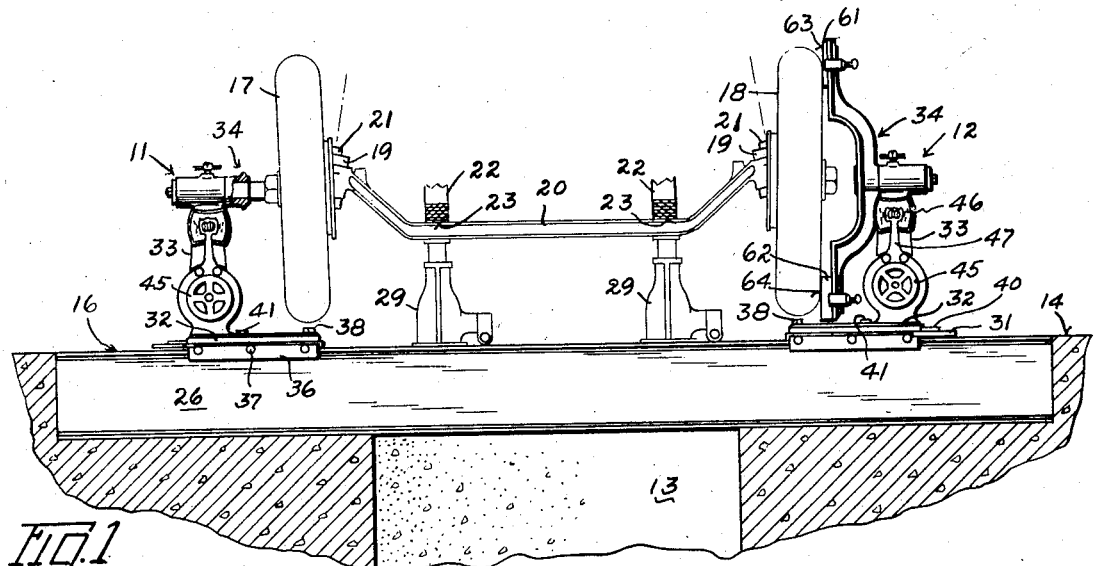
Figure 2:
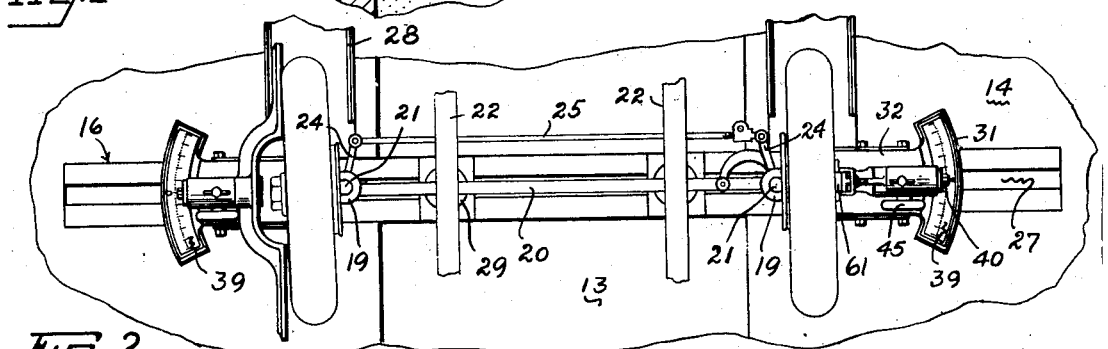
Figure 2 is a plan view of the showing of Figure 1.
Figure 3:
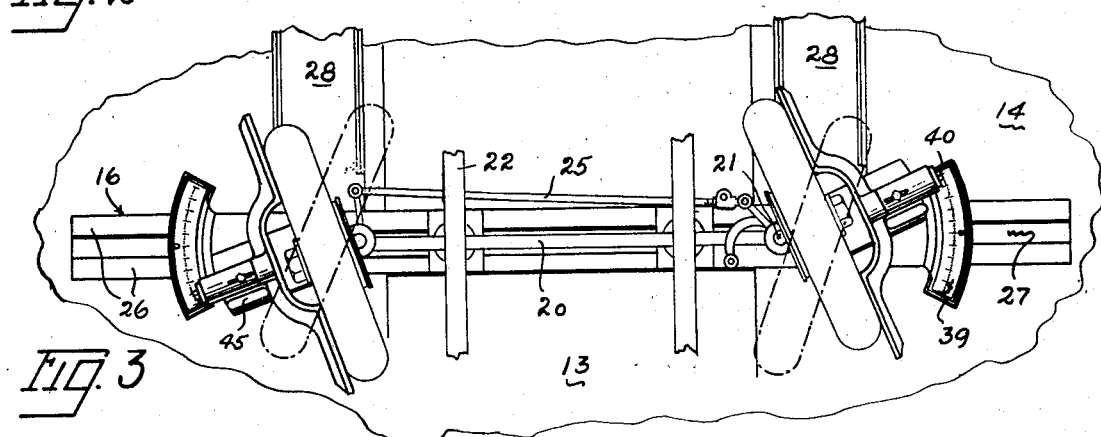
Figure 3 is a plan view wherein the disposal of the gauging units of the apparatus is that for determining the turning radius relation of the vehicle wheels.
Figure 4:
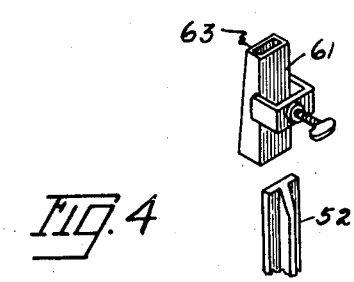
Figure 4 is a perspective view of a gauging block of the apparatus and the end of a test arm from which it has been longitudinally dismounted.
Figure 5:
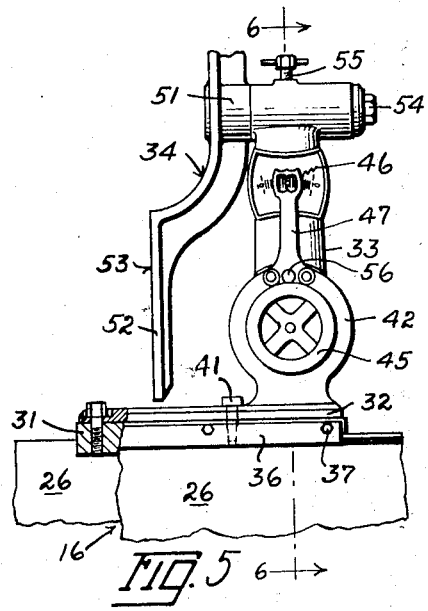
Figure 5 is a fragmentary elevation of a gauging unit of the apparatus.
Figure 6:
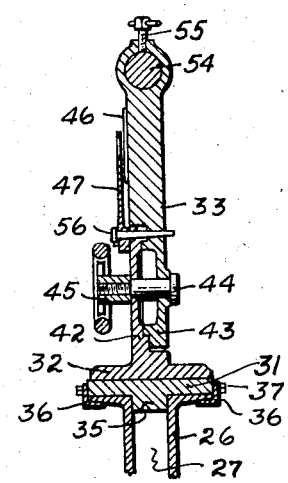
Figure 6 is a vertical section at 6—6 in Figure 5.
Figure 7:
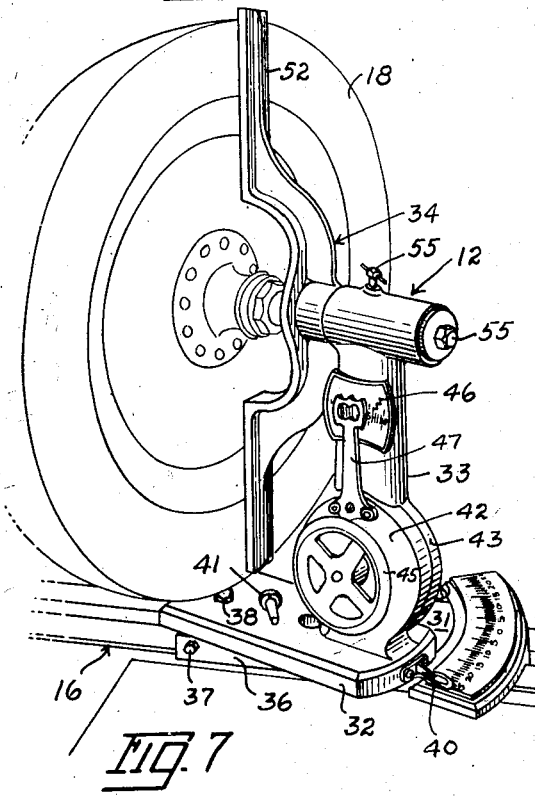
Figures 7 and 8 are perspective views of the aforesaid gauging unit as disposed during use thereof for determining the caster of a vhicle wheel.
Figure 8:
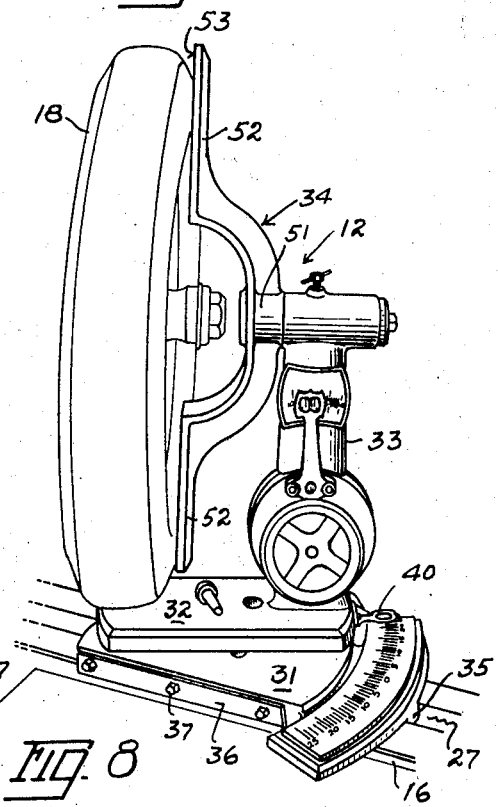

As particularly illustrated, the present invention is incorporated in the structure and use of similar gauging units 11 and 12 mounted for relative adjustment in a straight line and arranged to receive the dirigible wheel assembly of an automobile, or the like, between them. For convenience in making the necessary adjustments of the vehicle parts for effecting any required correction, a pit 13 is shown provided generally between the units 11 and 12 and underlying the surface 14 of a floor, said surface being preferably horizontal. A girder 16 spans the pit 13, said girder being arranged to provide a support for the steering wheel assembly. During testing, the right and left-hand vehicle wheels 17 and 18 are arranged to be disposed above the girder 16; as shown in Figures 1, 2 and 3, said wheels are mounted on the spindles of steering knuckles 19 pivoted to the ends of a common axle 20 by means of generally upright king-pins 21, the arrangement being a usual one for dirigible front wheels of a motor vehicle. The axle 20 in turn supports the vehicle body through springs 22, said springs engaging spaced spring perches 23 on the axle and being only fragmentarily shown. The usual spindle arms 24 extend from the steering knuckles 19 and are connected by a tie-rod 25 (Figure 2) of adjustable length.

As particularly disclosed, the girder 16 comprises a pair of channel members 26 disposed edgewise and in slightly spaced back-to-back relation whereby to define a slot 27 of uniform section between them. The channels 26 are relatively fixed, and the units 11 and 12 are slidably mounted thereon for adjustment longitudinally of the girder. The top surface of the girder 16 defined by the numbers 26 is preferably plane and horizontal. For making the various tests with the present apparatus it is desired that the vehicle axle 21 be disposed parallel to and vertically above the girder 16, and that the wheels be free for steering movement thereof about the king pins 21, the axes of said pins defining the steering axes for the wheels. To assist in disposing said axle as desired, parallel and appropriately spaced guideway channels 28 are extended from the girder 16 and at right angles thereto for so guiding the vehicle as it is moved into position for testing that the longitudinal axis of the vehicle is perpendicular to the girder and the axle 21 may be disposed in a vertical plane through the longitudinal girder axis.

With the vehicle disposed in the latter position, the axle 21 is raised, as by means of jacks 29 engaged between it and the girder, whereby the wheels may be lifted out of bearing engagement with the girder for free turning thereof about the king-pins 22 and for rotation about the spindles which carry them. For maximum accuracy of testing, it is highly desirable that the plane of the spring perches 23 be horizontal; the necessary adjustment may be readily effected by checking the equality of the distances from the girder to the under sides of the springs at points thereof immediately adjacent the spring perches. All of the hereinafter described gauging operations are made with the axle in this raised and horizontal position.

Referring now to the units 11 and 12 for use at the outer sides of the right and left-hand wheels 17 and 18 respectively, it is noted that said units are of similar structure but have their corresponding elements oppositely related in the respective assemblies whereby said elements are in corresponding relation to the adjacent wheels. By particular reference to Figures 5 to 8 inclusive, it is noted that each said unit essentially comprises a bed-plate or base 31, an horizontal turntable 32 carried by said bed-plate, a generally upright standard 33 hinged to the turntable for movement about an horizontal axis, and a testing head 34 swivelled in the upper end of the standard.

The bed-plate 31 comprises a somewhat elongated member having a depending and longitudinal rib or tongue 35 (Figure 6) for sliding engagement in the girder slot 27 when the bed-plate rests on the girder; in this manner, said bed-plate is held in fixed angular relation to the girder while slidable therealong to different adjusted positions. Angle members 36 bolted to the sides of the bed-plate 31 and having legs thereof slidably engaging beneath the flanges of the channel members 26, are provided for securing each unit assembly against upward displacement from its mounted position on the girder 16.

The pivotal axis of the turntable is defined by a vertical pivot pin 38 (Figure 5) engaging in and between the turntable and bed-plate, said pin being disposed somewhat inwardly of the bottom of the standard 33; as particularly shown, the pin 38 is provided adjacent the inner end of the bed-plate. An arcuate angle scale 39 is provided at the outer end of the bed-plate 31, the center of curvature of said scale comprising the turntable axis defined by the pin 38. A pointer 40 is carried at the outer edge of the turntable for movement over the scale 39, the zero of said scale being mediately thereof whereby the line of said zero point and the pivot pin 38 is parallel to the axial line of the girder 16. A tapered pin 41 is provided for cooperative engagement in the turntable and bed-plate when the pointer 40 is at the zero point of the scale 39 to hold the turntable against accidental displacement from a zero setting thereof, said setting being hereinafter referred to as the normal setting of the turntable.

An ear 42 extends upwardly from the turntable 32 and at a point thereof intermediate the pivot pin 38 and pointer 40, said ear being particularly shown as integral with the turntable element. A lower standard portion 43 complementarily engages a vertical face of the ear 42 and is pivotally secured thereto and thereagainst by means of a bolt 44 engaging through said ear and provided with a hand-wheel nut 45 for releasably fixing the standard in angularly adjusted relation to the turntable. The bolt 44 is horizontal and is perpendicular to a vertical plane through the pin 38 and pointer 40 whereby the standard 33 is arranged for angular adjustment solely in a plane parallel to, or coincident with, the first plane.

An angle scale 46 is provided on a side of the standard 33 for registration with a pointer 47 fixed to, and extending upwardly from, the turntable ear 42. The zero of the scale 46 is mediately thereof whereby the angular displacement of the standard from an intermediate zero position may be measured. For using the present apparatus in the hereinafter indicated manner, the angular range of the scale 46 need not be more than ten degrees to either side of the zero thereof.

The testing head 34, it will now be noted, comprises a hub portion 51 having arms 52 extending radially and oppositely therefrom and cooperative to provide portions of a testing or gauging bar having a planar face 53 for disposal in opposition to the outer side of the tire of a wheel to be tested. As shown, the test bar portions providing the test surface 53 are offset inwardly with respect to the inner hub end whereby a wheel hub may be received between their opposed ends, this feature being particularly brought out in Figures 1 and 8. A shaft 54 carries the hub 51, the axis of said shaft being perpendicular to the test surface 53. The shaft 54 is journalled in a transverse bore provided at the upper end of the standard 33 and for the rotation thereof about an axis at right angles to the pivoted axis of the standard, the relation of said axes to the turntable axis being such that movement of the shaft axis during the permitted arcuate translation of the testing head 34 is in a vertical plane including said turntable axis.

As particularly shown, the engagement of the shaft 54 in the standard 33 is arranged to provide a solely swivelled mounting of the head on the standard. Since it may be desirable, at times, to secure the head against rotation, a set-screw 55 is mounted in the standard for operative engagement with the shaft 54. When the swivelling axis of the head 34 is horizontal, as is particularly shown in Figures 1 and 5, the pointer 47 is arranged to register with the zero of the scale 46; the position of the standard 33 under these conditions will, for convenience, be hereinafter referred to as a normal, or vertical, disposal thereof. Means other than the nut 44 are provided for releasably securing the standard 33 in said normal upright position thereof; as disclosed in Figure 6, such means comprises a tapered pin 56 engageable in a tapered bore having complementary portions thereof in the turntable ear 42 and standard portion 43 and arranged for mutual alignment when the standard is in said normal position thereof. It is noted that when the standard 33 is in said normal upright position, the test plane 53 of the arms is vertical, and said arms are movable in a vertical plane as the head is rotated about the axis of the shaft 54.

For testing camber with the now described apparatus, and with the vehicle axle 20 mounted as shown and described, the wheels 17 and 18 would be set in the straight-ahead steering position thereof. The head 34 would then be disposed with the test bar provided by the arms 52 thereof in a vertical line while the pointers 40 and 47 register with the zero points of the respective scales 39 and 46, the various positions of the unit elements being particularly disclosed in the setting of the unit 12 with respect to the wheel 18 in Figures 1 and 2. If now the unit 12 be moved toward the wheel 18, the test surface 53 is seen to be angularly related to the opposed wheel face, the angularity of said wheel face being understood as the measure of the wheel camber.

The present apparatus is designed to positively indicate the same camber angle for all dirigible wheels to be tested, said angle being one of one and one-half degrees. To facilitate obtaining of a proper setting of camber, blocks 61 and 62 are provided for mounting on the ends of the upper and lower arms 52 at and opposite the wheel tire at upper and lower points thereof, said upper and lower blocks 61 and 62 respectively providing flat inner faces 63 and 64 for simultaneous engagement with the wheel tire when the camber of the wheel is correct. In the present instance, the arms 52 extend equally from the head axis, and when the outer block ends are flush with the arm extremities the faces 63 and 64 are arranged to be coplanar, with their plane making the desired camber angle with the test surface 53 of the arms; in this manner, the correct camber setting of the wheel is arranged to be defined in a particularly simple and positive manner. During the test, the wheel may be rotated to find its average side plane to correct for any tire or wheel irregularity. Correction of faulty camber may be effected by appropriately bending the axle 20 in a vertical plane therethrough.

While the previously described method of camber gauging is generally preferred by reason of its simplicity, an alternative method with the present apparatus is to dispose the arms 52 in parallelism with the outer tire side by appropriately rocking the standard 33 on its pivotal axis and simultaneously effecting any necessary horizontal shift of the test unit, and thereafter reading the indicated angle on the scale 39. In testing camber by this method the wheel would preferably be rollingly rotated to determine its average side plane opposite the arms 52, as in the previously described method. Since the pointer 47 is arranged to register with the zero of the scale 46 when the test surface 53 is truly vertical, this method is understood to give a direct reading of the camber angle and eliminates use of the blocks 61 and 62.

In dirigible wheel assemblies of the present type, caster is generally defined as the angle between the king pin and the vertical measured in a vertical plane extending longitudinally of the vehicle, and one effect of caster is to produce different camber values for a wheel for different turning positions thereof. The latter is utilized for determining the caster setting of a wheel with the present apparatus, the method essentially comprising the direct measurement of the camber value for right and left-hand positions of a wheel being tested by use of the scale 46.

It will now be noted that with the test arms 52 horizontal, and the pins 41 removed, the turntable may be rotated to permit a disposal of the straight-edge defined by the arms flat against the outer side of the wheel tire for different steering positions of the wheel. Since, however, the steering axis of the wheel is the axis of the king-pin 21, the pivotal axis of the turntable must as nearly as possible coincide with said steering axis in order that the reading of the pointer 40 may most closely indicate the actual degree of turning of the wheel from the zero of the scale 39. The present structure of the units 11 and 12, it is noted, is particularly designed to permit a disposal of the turntable pivot pins 38 in substantial alignment with the steering axes defined by the king-pins 21 while the arms 52 are in use for measuring the angular settings of the wheels. In accordance with present automobile design practice, the steering axis of each dirigible wheel of a pair is arranged to intersect the central tire plane substantially at the lowest, or ground-engaging point of the tire; accordingly, the present units would preferably be set with the pins 38 immediately below the lower and central tire points in all cases where steering angles are to be measured. In this manner, errors in the angle measurement are minimized and the readings of the scale 46 may be used without correction. This provision for disposing the turntable axis in substantial coincidence with the steering axis is understood as a particularly important feature of the present invention.

For gauging the caster of the wheel 18 with the present apparatus, said wheel is first set at a predetermined right-turn position (Figure 7) by use of the scale 39 in the described manner, and the camber angle of the wheel for such position is then measured by use of the standard scale 46. The wheel 18 is then set at a predetermined left-turn position (Figure 7) and the camber angle for its new position is read. The difference between the two camber angle readings is taken as a measure of caster, the correctness of which may be checked by reference to an appropriate tabulation (not shown) based on predetermined steering angles and the manufacturer's specification for the particular make of car being tested. In the present instance, it is noted that, by reason of the disposal of the turntable axis at or immediately adjacent the steering axis, and the fact that only a difference of angle readings is significant, the test arms 52 may be applied opposite the same tire points for both readings, and that no rolling rotation of the wheels would be permitted during the test. As particularly illustrated, the right and left-turn angles of the test are each twenty-five degrees. Correction for faulty caster is preferably made by inserting wedge shims (not shown) at the spring perches. As in testing camber, the caster determinations and corrections are independent for the two wheels and are made with corresponding operations at the different wheels.

For testing toe-in, the test arms 52 would be horizontally disposed, with the turntable 32 and standard 33 secured in their normal positions by means of the pins 41 and 56 respectively. One of the wheels of the pair would then be turned into parallelism with the test arms of the opposed head whereby the angularity of the other wheel to the arms of the other head would be the total toe-in angle for the two wheels. Gauging may be effected at the latter wheel by measuring from a front point of the tire to the opposite gauging arm, the rear gauging arm having been brought into engagement with a rear tire point. In Figure 2, the unit 11 is shown in operative relation to the wheel 17 for measuring toe-in thereat, the wheel 18 having been planed into parallelism with the longitudinal vehicle axis. Any needed correction of toe-in is effected by appropriately varying the effective length of the tie-rod 25.

In Figure 3, the positions of the wheels for checking the turning radius relations thereof are indicated. The necessary angle measurements are made solely by use of the turntable scales 39 of the testing units, readings being taken simultaneously for both wheels. This test involves a difference of readings, and is made by setting one wheel at a predetermined turn angle, and then measuring the turning angle of the other wheel. The difference of the two angle readings is compared with a tabulation (not shown) of preferred values of such differences, said tabulation based on the length of wheel-base of the vehicle and the predetermined angle of setting of the first wheel. Preferably, and as indicated, the "outside" wheel is set at a predetermined angle of twenty degrees whereby the other angle would exceed twenty degrees on account of the toe-out of the wheels under these conditions. Correction for turning radius is made by appropriately bending the steering arm 26 of the measured wheel in an horizontal plane. If turning radius correction is made, it will be necessary to re-check and correct the toe-in setting in the manner previously described.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a wheel gauging device of the character described, a testing head for operative disposal adjacent a side of a wheel to be tested, and a turntable carrying said head for angular adjustment about a vertical axis intersecting the central plane of the wheel tire adjacent a bottom point of the tire while said head is in gauging relation to the wheel.

2. In a wheel gauging device of the character described, a track, a turntable supported on and adjustable along said track, a standard pivoted to said turntable for angular adjustment in a plane intersecting the turntable plane, and a testing head providing a test bar for disposal opposite and adjacent a wheel side and carried by said standard for the movement of said bar in a plane at right angles to the plane adjustment of said standard.

3. In a wheel gauging device of the character described, a vehicle runway, a track extending transversely of said runway, a turntable supported on and adjustable along said track, a standard pivoted to said turntable for angular adjustment in a plane intersecting the turntable plane, and testing head providing a test bar for disposal opposite and adjacent a wheel side and swivelled to said standard for the movement of said bar solely in a plane at right angles to the plane of adjustment of said standard, the pivotal axis of said turntable arranged to substantially coincide with the point of intersection of the steering axis of said wheel with the central wheel plane when said bar is in gauging position with respect to the wheel.

4. In a wheel gauging device of the character described, a turntable for disposal in close adjacency to a wheel to be gauged, a standard pivoted to said turntable for adjustment solely in a plane perpendicular to the turntable plane, a testing head carried by said standard for disposal in operative position opposite and adjacent a wheel side while the pivotal axis of said turntable substantially coincides at the turntable with the steering axis of said wheel, and scale-and-pointer means coactive between said standard and turntable to measure the angularity of the standard with respect to the turntable.

5. In a wheel gauging device of the character described, a turntable for disposal in close adjacency to a wheel to be gauged, a standard pivoted to said turntable at a point removed from the turntable axis for angular adjustment solely in a plane perpendicular to the turntable plane, a testing head carried by said standard for disposal in operative position opposite and adjacent a wheel side while the pivotal axis of said turntable substantially intersects at the turntable the steering axis of said wheel, and scale-and-pointer means to measure the rotative displacement of said turntable from an intial position thereof.

6. In a device for gauging the alignment relations of a cooperating pair of vehicle steering wheels carried at the extremities of an horizontal axle, movable bed-plates, a fixed base member carrying said bed-plates for independent adjustment along a line parallel to and beneath the longitudinal axis of said axle, turntables mounted on said bed-plates for adjustment about vertical axes and gauging members adjustably carried by said turntables and providing reference faces for simultaneous or selective disposal opposite and adjacent the outer faces of the different said wheels for gauging purposes with respect thereto, the axes of said turntables arranged to intersect the central planes of the wheel tires substantially at the bottom wheel points when said gauging members are in said operative relation to the respective wheels.

7. In a device for gauging the alignment relations of a cooperating pair of vehicle steering wheels carried at the extremities of an horizontal axle, movable bed-plates, a fixed base member carrying said bed-plates for independent adjustment along a line parallel to and beneath the longitudinal axis of said axle, turntables mounted on said bed plates for adjustment about vertical axes, gauging members adjustably carried by said turntables and providing reference faces for simultaneous or selective disposal opposite and adjacent the outer faces of the different said wheels for gauging purposes with respect thereto, the axes of said turntables arranged to intersect the central planes of the wheel tires substantially at the bottom wheel points when said gauging members are in said operative relation to the respective wheels, and scale-and-pointer means on said bed plates and turntables to measure the rotative displacements of said turntables from initial positions thereof.

8. In apparatus for gauging the alignment relations of a cooperative pair of dirigible wheels of a vehicle, said wheels normally supporting an axle between them, testing heads disposable at opposite ends of said axle and generally outwardly of said wheels and including test bars, and standards carrying said heads for translation thereof in arcuate paths lying in angularly related vertical planes generally including the steering axes of the respective wheels and for the adjusted rotation of said bars between different testing positions thereof and in planes at right angles to said vertical planes and about axes tangent to the said paths therein.

9. In apparatus for gauging the alignment relations of a cooperative pair of dirigible wheels of a vehicle, said wheels normally supporting an axle between them, testing heads disposable at opposite ends of said axle and generally outwardly of said wheels and including test bars, and means carrying said heads for translation thereof in horizontal and arcuate paths having their centers of curvature lying in vertical axes extending approximately from the points of intersection of the steering axes with the central planes of the respective wheels.

10. In apparatus for gauging the alignment relations of a cooperative pair of dirigible wheels of a vehicle, said wheels normally supporting an axle between them, testing heads disposable at opposite ends of said axle and generally outwardly of said wheels and including test bars, and means carrying said heads for translation thereof in arcuate paths lying in vertical planes generally including the steering axes of the respective wheels and in horizontal and arcuate paths having their centers of curvature lying in vertical axes extending approximately from the points of intersection of said steering axes with the central planes of the wheels.

11. In a wheel gauging device of the character described, a testing head providing a reference surface for disposal adjacent and diametrically of a dirigible wheel to be tested, and means carrying said head for angular adjustment about a vertical axis disposed inwardly of said surface whereby said axis may be placed in approximate alignment with the steering axis of said wheel.

12. In combination with a test arm for disposal vertically and adjacent dirigible wheels of different diameters to be tested for the camber setting thereof, tapered test blocks mounted on the arm in fixed mutual spacing and having mutually coplanar flat faces to define a test surface having the desired camber angularity for the wheels, said block faces arranged to lie opposite and engage diametrically spaced side points of said wheels to be tested.

13. In a wheel gauging device of the character described, a testing head for disposal adjacent a side of a wheel to be tested, and a turntable carrying said head for angular adjustment about a vertical axis, said axis arranged to intersect the bottom point of the wheel while said head is in gauging relation to the wheel.

JOHN C. CREAGMILE.